No. 675,047. Patented May 28, 1901.
W. H. MacGARVEY & G. TANNER.
CASING CLAMP.
(Application filed Feb. 26, 1901.)

(No Model.)

WITNESSES:

INVENTORS
William Henry MacGarvey
George Tanner
BY
ATTORNEYS

UNITED STATES PATENT OFFICE.

WILLIAM HENRY MacGARVEY, OF GLINIK MARYAMPOLSKI, AND GEORGE TANNER, OF STRYJ, AUSTRIA-HUNGARY.

CASING-CLAMP.

SPECIFICATION forming part of Letters Patent No. 675,047, dated May 28, 1901.

Application filed February 26, 1901. Serial No. 48,878. (No model.)

*To all whom it may concern:*

Be it known that we, WILLIAM HENRY MACGARVEY, of Glinik Maryampolski, and GEORGE TANNER, of Stryj, Province of Gallicia, Empire of Austria-Hungary, have invented certain new and useful Improvements in Casing-Clamps, of which the following is a specification.

This invention relates to an improved casing-clamp, and has for its object to present a simple and very efficient appliance for sustaining in a reliable manner the tubular casing of a bore-hole during the time of the hole being bored and cleaned. Until now there have been used simple clamps, which sometimes fail and let the casing escape, so that the latter sinks down, and thus hinders the work.

The improved casing-clamp of this present invention consists of two clamping-jaws so arranged that if the casing held between the two jaws tends to sink down these jaws close tightly and automatically around the casing and prevent sinking down of the latter. The two jaws when in open position—*i. e.*, during pulling forth of the casings—are retained by means of a bolt which can easily be inserted between and withdrawn from the jaws, so that the casing may always be in a secure manner released and sustained, as the case may be.

Figure 1:
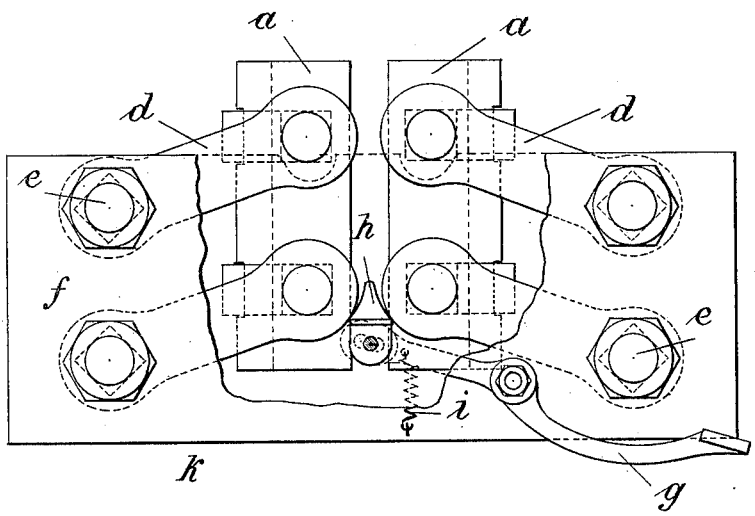
Figure 2:
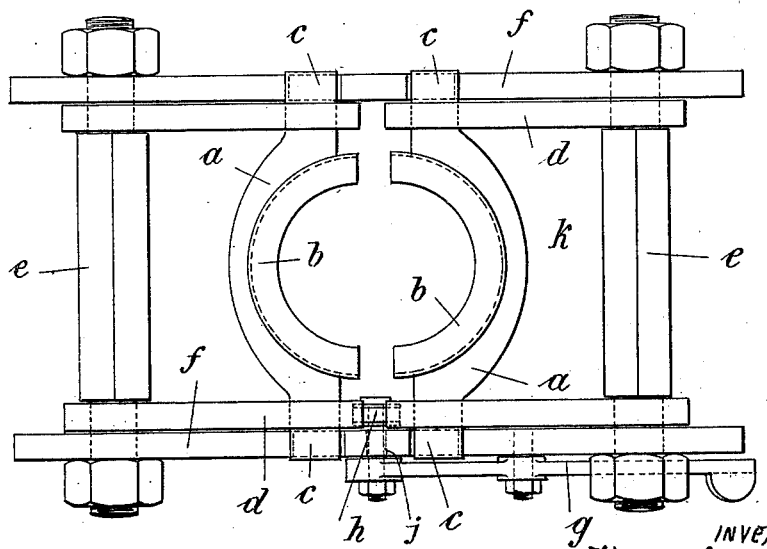

Figures 1 and 2 of the annexed drawings represent in a side view and in plan the improved casing-clamp.

As is obvious, the clamp consists of the two clamping-jaws $a$, provided, if required, on their inner surfaces with a lining $b$ and each carrying at top and at bottom two bolts or cross-bars $c$, to which are hinged the inner ends of supporting-arms $d$ $d$, the opposite ends of which turn on cross-bolts $e$, forming a frame $k$ with the longitudinal walls $f$. This frame is placed above the top opening of the bore-hole and surrounds the same. The supporting-arms $d$ extend obliquely upward from the bolts $e$ toward the clamping-jaws in such a manner that the two jaws are movable up and down and parallel one to the other and tend constantly to sink down and to approach each the other, and thereby maintain in a reliable manner the casing between them. In case it is desired to lower the latter the two clamping-jaws must be opened or raised and retained in their lifted position. For this purpose we arrange a treadle $g$ on one side of the frame $k$. One end of this treadle carries a bolt $h$, projecting through a slot $j$ of the frame $k$, and is raised with the one end of the treadle $g$ when the latter is moved down and enters between the two clamping-jaws and beneath the lower set of the supporting-arms $d$, and thus prevents closing of the jaws as long as the treadle $g$ is being kept down. In case, however, the treadle is relieved—that is to say, in case the casing is to be sustained—the bolt $h$ falls back, thus freeing the clamping-jaws, which then fall down, too, and clamp the casing. The downward movement of the bolt $h$ is hereby assisted by a spring $i$, fixed with one of its ends to the frame and with its other to the treadle.

We claim as our invention—

1. In a casing-clamp: in combination: two clamping-jaws $a$, a supporting-frame $k$ having a slot $j$ in its side wall, arms $d$ $d$ hinged to the clamping-jaws and to the supporting-frame, a vertically-moving bolt $h$ projecting through the slot $j$ and means for forcing it upward between the clamping-jaws and under the arms $d$ $d$ for retaining the clamping-jaws in their opened position substantially as described.

2. In a casing-clamp the combination of two clamping-jaws $a$, of a supporting-frame $k$, arms $d$ $d$, hinged to the jaws $a$ $a$ and to the frame $k$, a bolt $h$ projecting through a slot $j$ of one of the sides of the frame $k$ and a treadle $g$ carrying on one of its ends the bolt $h$ and being journaled to one of the sides of the frame $k$ substantially as described.

3. In a casing-clamp in combination: two clamping-jaws $a$ $a$, a supporting-frame $k$, supporting-arms $d$ $d$ hinged to the jaws $a$ $a$ and to the frame $k$, a treadle $g$ carrying a bolt $h$ projecting through one of the sides of the frame $k$ and a spring $i$ fixed with one end to the frame $k$ and with its other end to the treadle $g$ substantially as described.

In witness whereof we have hereunto set our hands in presence of two witnesses.

WILLIAM HENRY MacGARVEY.
    GEORGE TANNER.

Witnesses:
 ALVESTO S. HOGUE,
 JOHANN LUST.